United States Patent [19]
Berkin et al.

[11] 4,441,205
[45] Apr. 3, 1984

[54] PATTERN RECOGNITION SYSTEM

[75] Inventors: George M. Berkin, Yardley, Pa.;
Michael Negin, Cinnaminson, N.J.

[73] Assignee: Kulicke & Soffa Industries, Inc., Horsham, Pa.

[21] Appl. No.: 264,481

[22] Filed: May 18, 1981

[51] Int. Cl.³ ............................................. G06K 9/32
[52] U.S. Cl. ........................................ 382/8; 382/14; 382/18; 382/34; 382/48
[58] Field of Search ................. 382/8, 14, 15, 34, 18, 382/48; 343/5 MM; 179/1 SB, 1 SD; 364/448, 447, 449, 456, 488–491; 356/373, 375; 358/103, 107

[56] References Cited

U.S. PATENT DOCUMENTS

| 3,521,235 | 7/1970 | Becker | 382/14 |
|---|---|---|---|
| 3,593,286 | 7/1971 | Altman | 382/34 |
| 3,626,368 | 12/1971 | Lee | 382/15 |
| 3,636,513 | 1/1972 | Tisdale | 382/14 |
| 3,717,848 | 2/1973 | Irvin et al. | 382/48 |
| 3,727,183 | 4/1973 | Lemay | 382/37 |
| 3,898,617 | 8/1975 | Kashioka et al. | 382/8 |
| 3,952,299 | 4/1976 | Hodge et al. | 382/34 |
| 3,974,328 | 8/1976 | Thomas et al. | 343/5 MM |
| 4,115,761 | 9/1978 | Ueda et al. | 382/37 |
| 4,164,728 | 8/1979 | Marsh | 382/34 |
| 4,233,625 | 11/1980 | Altman | 382/44 |
| 4,334,241 | 6/1982 | Kashioka et al. | 358/107 |

Primary Examiner—Leo H. Boudreau
Attorney, Agent, or Firm—Woodcock, Washburn, Kurtz, Mackiewicz & Norris

[57] ABSTRACT

An improved pattern recognition system is disclosed which converts rows and columns of digitized video signal elements indicative of light intensity falling on a camera into integrated signatures, one for each of two orthogonal directions. Signatures corresponding to effectively rotated images may also be provided. Portions of the signatures having the most useful information contained therein are selected by comparison with subsets of the total signatures in a teach mode. In a run mode, the thus selected sub signatures are compared with snapshot signatures of a target object, such as integrated circuit dice, for precise location of corresponding portions of the target object.

37 Claims, 12 Drawing Figures

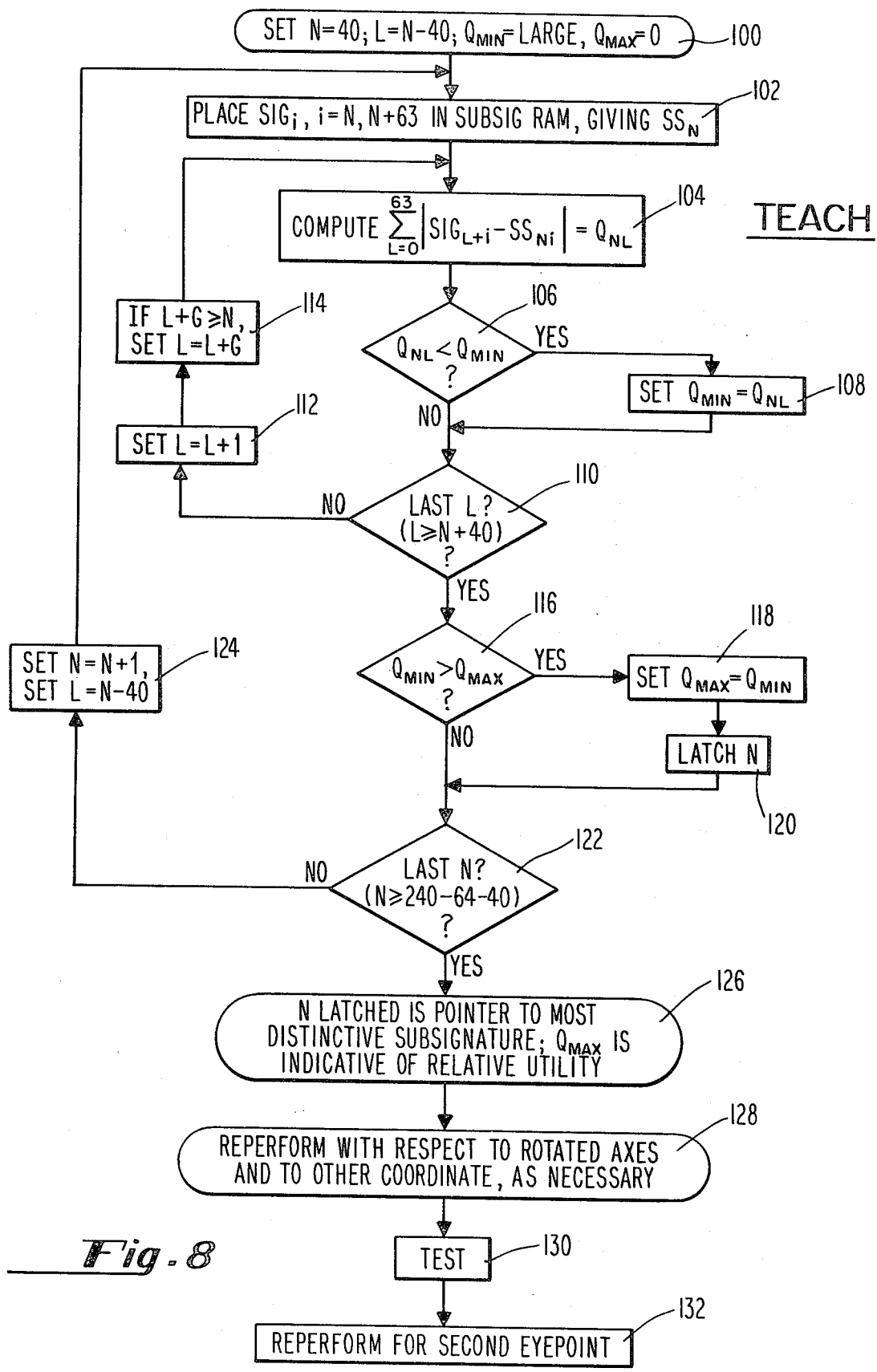

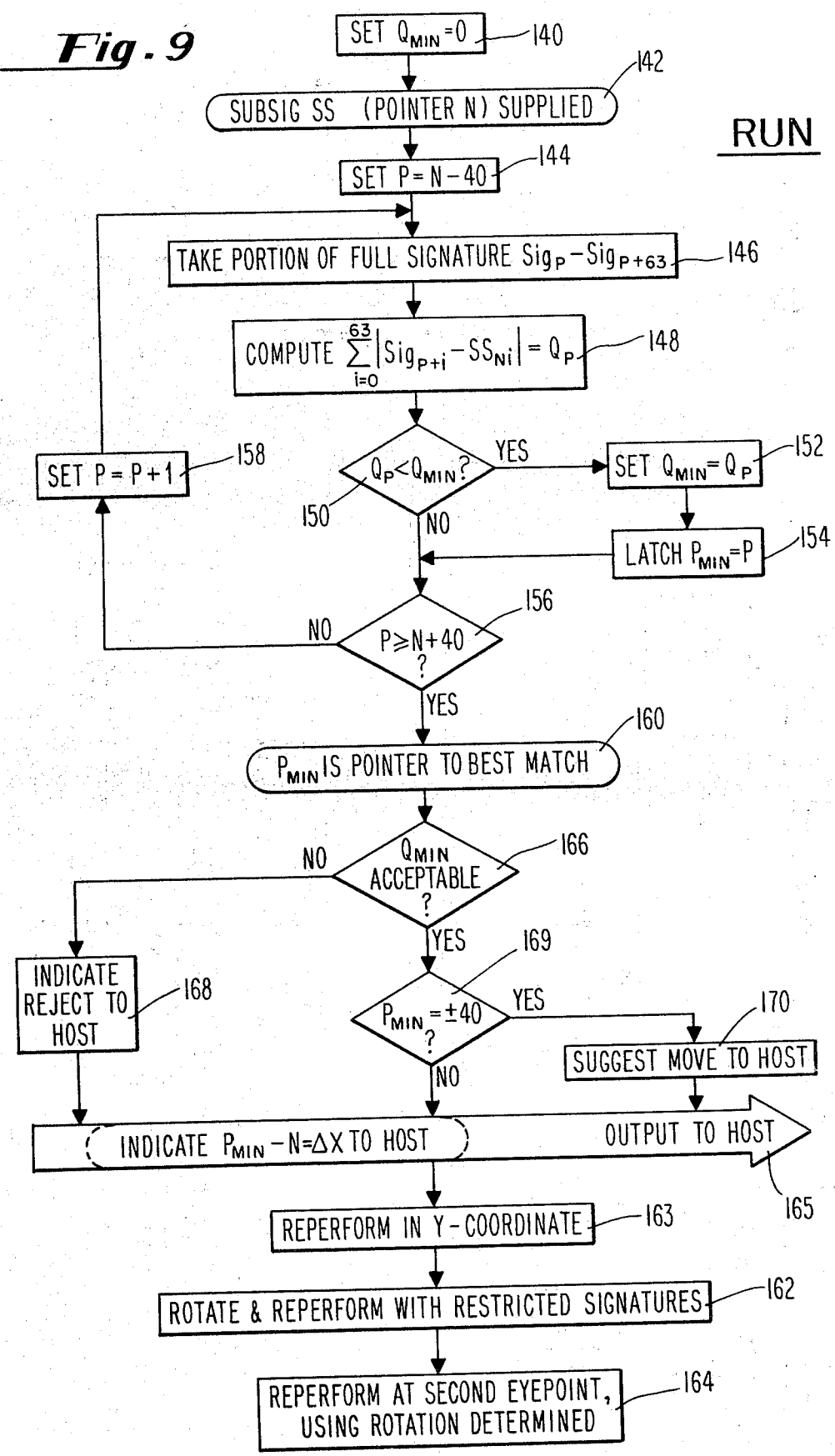

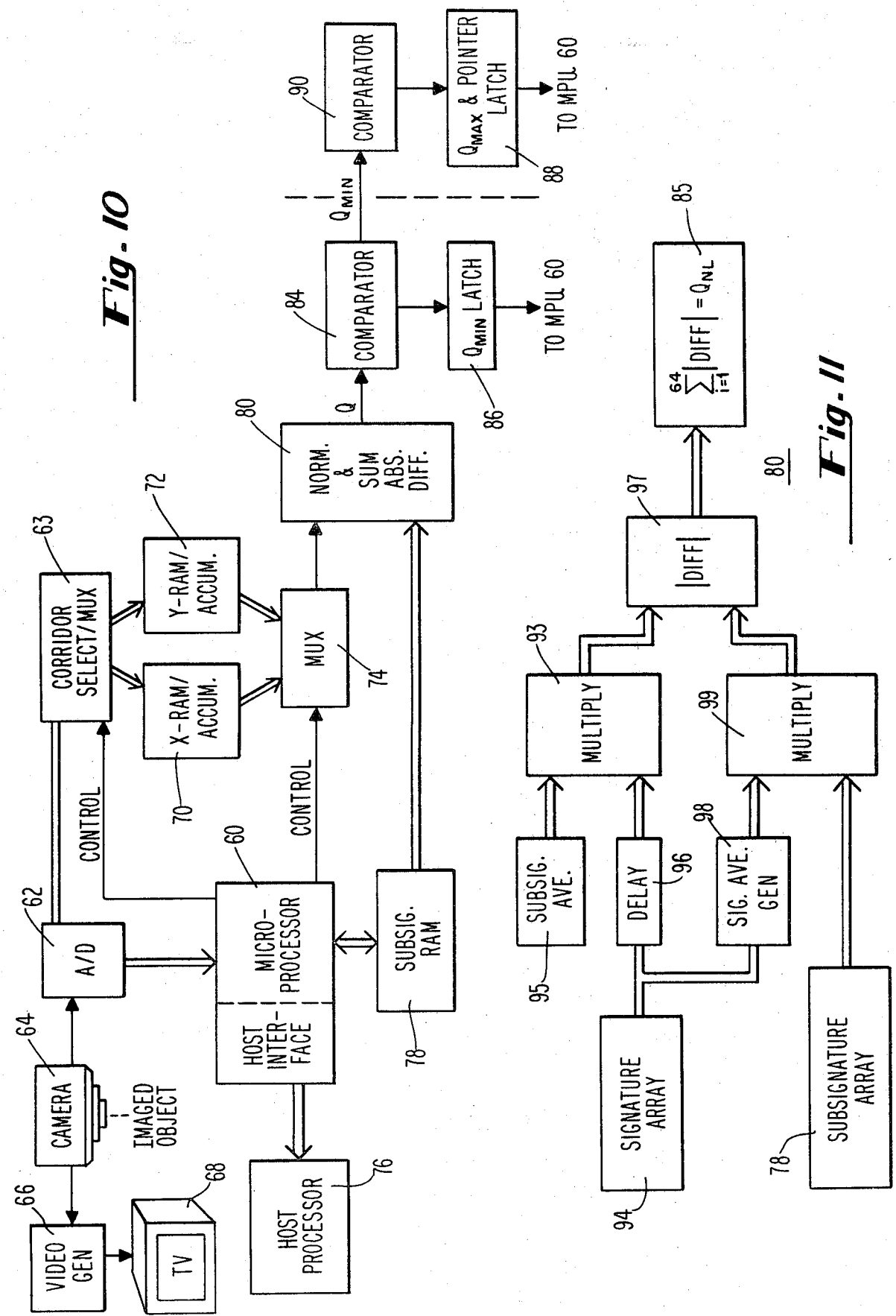

PATTERN RECOGNITION SYSTEM

FIELD OF THE INVENTION

This invention relates to automated apparatus and methods for locating one or more particular points on a predetermined pattern with great accuracy. More particularly, the invention relates to apparatus for location of an integrated circuit chip precisely with respect to wire bonding apparatus, whereby leads may be attached to bonding pads formed as part of the microcircuit to connect it to the "outside world".

BACKGROUND OF THE INVENTION

The well publicized advances in integrated circuit technology have rendered these electronic components increasingly small. Among many technical difficulties to be solved in connection with the miniaturization of these components is the connection of wires thereto. Clearly it would be of little avail to make a miniature circuit if the wires could not be connected to it due to operator inability to physically connect the wires to the very small contact spaces provided. Accordingly, there have been developed a class of bonding machines, referred to herein as host machines, in which once an operator has precisely located the integrated circuit chip or "die" with respect to a reference location, the host machine then is fully capable of attaching the bond wires to bonding pads at predetermined locations with respect to the reference location, e.g., by application of ultrasonic or heat energy. The pattern recognition system of the invention is described in connection with precise location of an integrated circuit die with respect to a host wire bonding machine but has utility in location of other workpieces with respect to other sorts of corresponding hosts.

Presently, the location of the die with respect to the reference location is either done by an operator or by automated machinery. Clearly it would be desirable to replace the operator with automated machinery so that labor could be saved. However, the automated machinery available to date has not been adequate to satisfy the needs of the art.

Typically dies are supplied pre attached to the remainder of the integrated circuit of which they are the main component. The body of the integrated circuit itself can be accurately located with respect to the bonding machine. However, the precise location of the die on the body of the eventual integrated circuit device may vary from its nominal position by on the order of 10 mils in any direction and may additionally be angularly displaced from its proper orientation. The manufacturing capabilities of present day integrated circuit operations are such that it is important to be able to properly bond leads to integrated circuit chips displaced angularly on the order of ±7°, and linearly by up to 10 mils in any direction from the nominal position. It will be appreciated by those skilled in the art that the bonding pads to which the wires must be attached are typically only about 4 mils square. Accordingly, to locate these bonding pads with sufficient speed and accuracy to enable proper and rapid bonding is a task of technical complexity and one which has not been adequately performed in the prior art.

Prior art pattern recognition systems are typically of the template matching kind, in which a stored portion of the pattern to be located is compared iteratively with various corresponding portions of the "target" pattern to be precisely located. See, e.g., U.S. Pat. No. 4,200,861 to Hubach et al. This, it will be recognized, is a very time consuming procedure, particularly where the target may be angularly displaced, as the relative movement of the stored portion required with respect to the target must be simultaneously made in both X and Y directions—that is, X and Y displacement cannot be determined independently by a template matching system, as both must be found simultaneously for a match to be detected.

OBJECTS OF THE INVENTION

Accordingly, it is an object of the invention to accurately locate a target object without the necessity of template matching of the object to a reference object.

It is a related object of the invention to provide a method and apparatus for the performance thereof for pattern recognition wherein X and Y displacements can be measured independently.

It is a further object of the invention to provide a high speed, highly reliable pattern recognition system which accommodates substantial linear and angular displacement of the target from the nominal target position.

It is a further object of the invention to provide a means whereby operator intervention in the determination of the position of a target die with respect to a nominal reference point may be eliminated.

A further object of the invention is to provide a system for the recognition and precise location of a die to which lead wires are to be bonded which accomplishes its task in less time than previously possible.

A further object of the invention is to provide a pattern recognition system in which even if the die is displaced outside the normal operating range of the instrument, an indication may still be provided to a host machine of its probable location so that upon retry the probability of proper location of the die is improved.

A further object of the invention is to provide a system which does not require special targets, but accepts virtually any non-monotonous scene as unique reference locations.

Yet another object of the invention is to provide a system for pattern recognition capable of detecting target rotation, thus improving the probability of properly locating the target.

Another object of the invention is to provide a pattern recognition system useful in connection with integrated circuit components capable of precise location of other constituent portions of an integrated circuit package, such as outer lead pads, ground or jumper chips and the like.

Another object of the invention is to provide automated means for selection of an optimal reference image representation for comparison with a target image.

An ultimate object of the invention is to provide a pattern recognition system for the precise location of integrated circuit dice with respect to a reference location which can be implemented relatively simply and inexpensively, and offer improved performance over prior art apparatus at substantially the same cost.

SUMMARY OF THE INVENTION

The above needs of the art and objects of the invention are satisfied by the present invention which comprises an apparatus for precise determination of the exact location of an object, for example, an integrated circuit die, with respect to a reference location. The apparatus is first operated in a teach mode in which a sample die is oriented by an operator with respect to a reference point. The apparatus then optically scans the die and generates a unique representation of its visible appearance. The representation of the visible appearance is then analyzed to locate that portion corresponding to the most unique portion of the visible appearance of the die. This is performed in both X and Y directions and with respect to angular variation in the die position. Thereafter, in the run mode, upon supply of a target die to the apparatus, the stored representation of the unique portion of the die is compared with a normalized representation of the target die, generating an error function; the minimum error function detected is that corresponding to the displacement from the nominal position. This may be performed several times with respect to both X and Y and with respect to differing portions of the target die displaced some distance from one another, so as to enable any errors in the identification to be detected and corrected.

BRIEF DESCRIPTION OF THE DRAWINGS

The invention will be better understood if reference is made to the accompanying drawings, in which:

FIG. 8 shows a flowchart of the teach operation in which the sub signatures are generated, and the most useful selected;

FIG. 9 shows a flowchart of the run operation;

FIG. 10 shows a block diagram of the hardware used in accomplishment of the flow diagrams shown in FIGS. 8 and 9;

FIG. 11 shows an expanded block diagram of the normalizing apparatus; and

DESCRIPTION OF THE PREFERRED EMBODIMENTS

Figure 1:
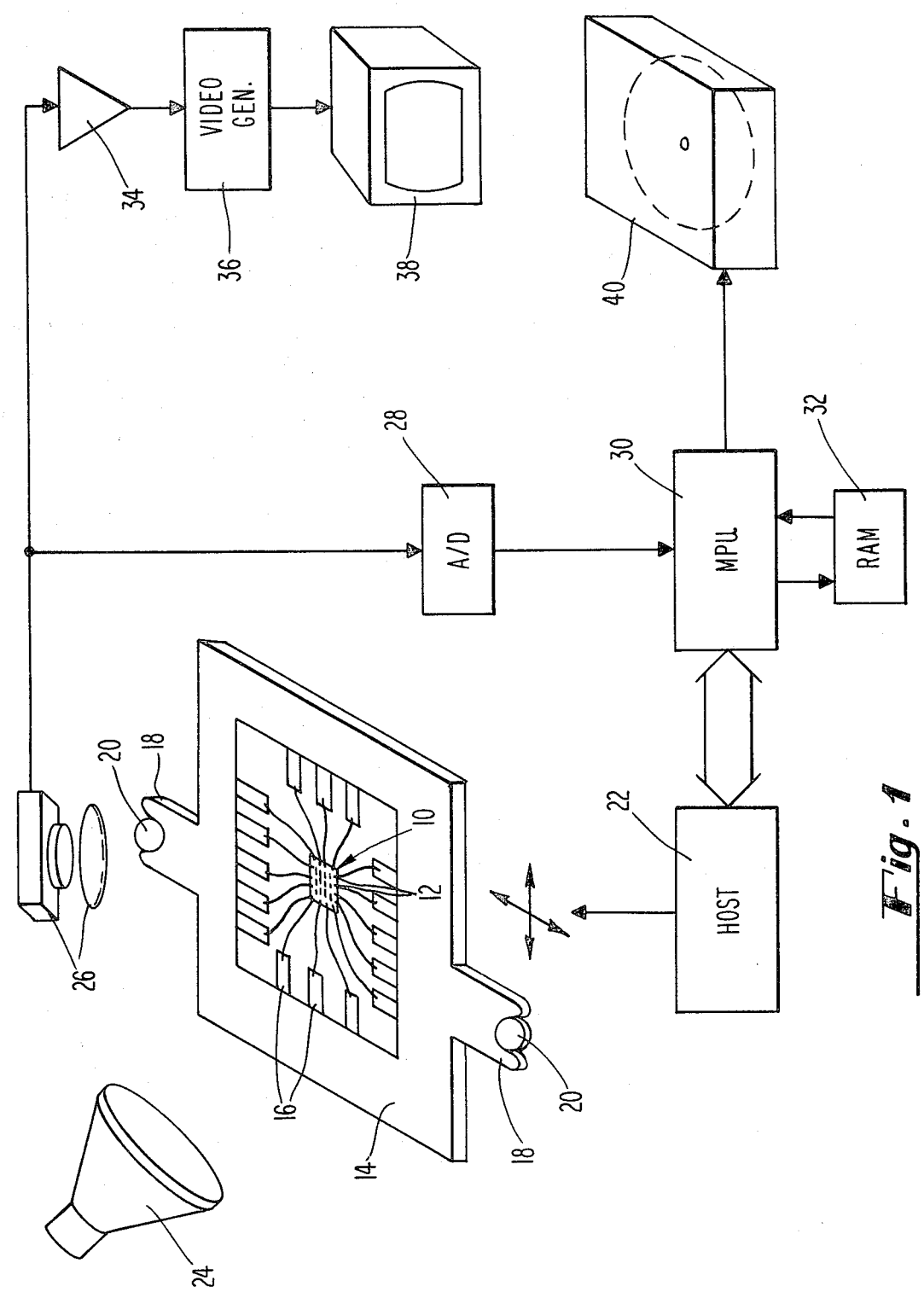
FIG. 1 shows a schematic view of the overall system of which the pattern recognition system of the invention is a part.

FIG. 1 shows a schematic view of a system for bonding wire leads to integrated circuit dice according to the invention. A die 10 provided with bonding pads 12 is affixed to an integrated circuit device indicated generally at 14. This device 14 is fitted with a plurality of lead connections 16, which are large enough that they can be attached to conventional terminals, such as in-line pins, and the like. The device 14 is shown schematically as provided with means 18 adapted for mating with index means 20 disposed on a host bonding machine. The host machine is provided with a table on which the index means 20 are disposed; the table is adapted to be movable in orthogonal directions, as indicated by the arrows, under the control of the host controller indicated generally at 22. Such devices, further including means for attaching wire leads to bonding pads as at 12, are known in the prior art and need not be further discussed here What is relevant here is the means of indicating to the host controller where precisely the die, and hence the bonding pads 12, are with respect to the host machine; that is, the precise relationship between the index means 20 and the bonding pads 12 is that which is determined by the apparatus of the invention. The apparatus for performing this operation comprises a source of light 24 and optical and camera means 26 which may comprise a video tube, a vidicon, or the like, adapted to sweep raster-fashion over an area corresponding to the area viewed. The analog signals output by the video image device 26 may be converted in an analog-to-digital converter 28 to digital representations of the light intensity falling on the camera at corresponding locations in known fashion. Typically the field of the view of the image forming device 26 is divided into an N by M array of square areas on its surface, referred to as picture elements, or "pixels", and a digital number representative of the light intensity or gray level within that area is provided for each of the $N \times M$ pixels. In a preferred embodiment of the present invention a 4-bit word providing 16 stages of light density is used to represent each pixel; the pixels are 0.00025" square, that is, there are four pixels per mil. The digitized samples are supplied to a microprocessor unit 30, supplied with random access memory means 32, which supplies signals to the host controller 22 as noted. A buffer amplifier 34 may also be provided to drive a video generator 36 which supplies a television screen 38 with a picture of what is viewed by the camera 26 to assist in the operator location of the chip with respect to reference locations during the teach operation, as will be outlined below. The microprocessor may also feed on-line storage means such as a floppy disk drive shown schematically at 40 for storage of information generated according to the method of the invention, as will be discussed in detail below.

Figure 2:
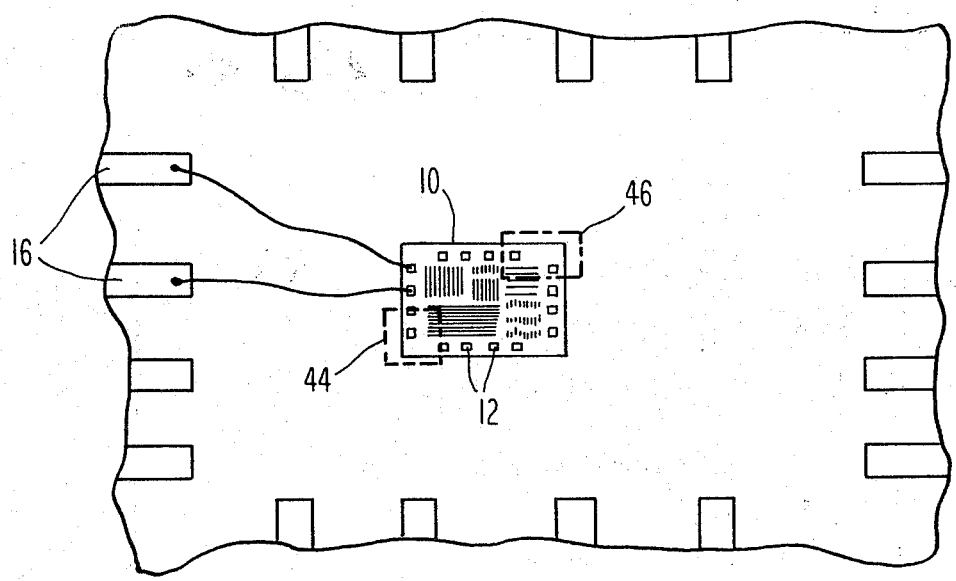
FIG. 2 shows the layout of a typical integrated circuit die on an integrated circuit device.

FIG. 2 shows a more detailed view of an integrated circuit die 10 provided with bonding pads 12 as in FIG. 1. Also shown in FIG. 2 are the ends of lead connections 16 and wires connecting the bonding pads 12 with the connections 16. Two fields of view of the video camera 26 are shown in outline form at 44 and 46. As noted these each "see" a portion of the total die 10. In the prior art, the operator might align a reference point on each target die with a cursor or other mark within the camera, and using this information then traverse a specific distance of the table containing the indexing means 18 to a second field of view as at 44 to confirm whether in fact the initial determination was performed correctly. By spacing the two fields of view 44 and 46 as far as possible from one another on the face of the die, any errors in the initial identification will be magnified thus tending to show them up and enabling their correction. The actual size of the fields of view may be chosen in accordance with the size of the die, to allow this. According to the present invention, the operator need only visually align a die with a cursor once for each of the eyepoints 44 and 46 in the teach mode; thereafter, this function is performed, in the run mode, without operator intervention, at high speed and with high reliability. Those skilled in the art will recognize that the die depicted in FIG. 2 will typically be on the order of 48 mils square (though wide variation is possible) while the bonding pads 12 are typically 4 mils square, while the connections 16 are typically large enough that index means 18 and 20 (FIG. 1) is adequate to locate them. Accordingly, it is one object of the apparatus of the invention to provide a precise indication of the exact position of the bonding pads 12 with respect to an externally keyable means such as the connections 16 so as to enable connection of the wires 42 therebetween. Thereafter the host controller, as in the prior art, is adequate to actually form the connection.

The following definitions will be found useful in understanding of the detailed description of the invention.

Gray Level: Light intensity code for each pixel, typically 4 bits, providing 16 gray levels.

Guard Band: That portion of the error function which is 8 or less units away from the home or originating position of the subsignature being tested. It exists to ignore low mismatch values associated with the neighborhood of origin.

Error Function: Series of sums of absolute differences using normalization and having $N-M+1$ points, where N is the number of values in the signature, and M is the number of values in the subsignature.

Full Signature: 240 sums obtained by the addition of the values of the central 240 coded gray levels of the horizontal lines of the 240 sums obtained by the addition of the gray level values of the center 240 columns of pixels.

Teach area: All the pixels in a central square area of an image during the teach operation. The area is 160 pixels wide and 160 pixels high.

Restricted Signature: 144 sums obtained from a corridor 144 pixels wide and either 200 or 160 deep.

Subsignature: 64 adjacent sums selected by the Max/Min process from the teach window.

Sum of Absolute Differences: The result of comparison of 64 adjacent sums which are a portion of a full or a restricted signature with the 64 sums in a subsignature. Pair differences after normalization are accumulated without regard to sign, yielding a value inversely related to the similarity of the signature portion and the subsignature.

Running Average: Average values of 64 sums, recalculated for every group of 64 used.

Normalization: The calculation of each element of an error function (EF) involves: signature average, subsignature average, signature element, subsignature element, in an operation that generates EF values within a well defined range. The EF values are also a function of the "AC content" of the signature and the subsignature. To reduce the sensitivity of the normalization to this, the scaling factor (SF) is used. The SF is created by comparison of the subsignature with its own average.

Rotated Signature: Series of sums obtained by accumulation of gray level codes associated with lines at a particular angle to the horizontal (for row sums) and vertical (for column sums). This is accomplished by using groups of 12 pixels in a row or column added to the next group which is displaced one row or column, and so on.

Pointers: 1: The address or location of the origin, the starting address, of a subsignature. 2. The address or location of the best fit or minimum mismatch of a subsignature as shown by an error function.

Q value: The minimum mismatch value in an error function indicative of the best fit made by a given subsignature with an entire signature.

Scaled Q (SQ): SQ is a Q value scaled to incorporate certain characteristics of the subsignature. Scaled Q is given by dividing the chosen Q by the scaling factor.

Home Position: The portion of a signature from which a given subsignature is drawn.

Scaling Factor (SF): SF compensates for the effects of normalization and the "AC component" on the size of the Q value. The SF is equal to the Q value which would be obtained by matching a subsignature to a signature in which all the sums were equal to the subsignature average; this corrects Q for, e.g., variations in light intensity.

Snapshot: The acquisition of a video frame. The request for a snapshot precedes and waits for the next occurring vertical synchronization pulse.

Corridor: An area array of pixels. The width of the array (looking from the signature) is always 144, which permits 81 adjacent groupings of 64. The depth is 240 for first pass, 200 for second pass, and 160 for third pass. The location of the corridor within the 240×240 field of view is determined by rules set forth in the RUN description.

Reference Point: The geometric center of the scene presented for storage as an Eye Point during TEACH. More precisely, it is the point on the surface of the die that coincides with the scene's center.

Max/Min Selection: During TEACH, one of the 97 possible groups of 64 adjacent sums derived from the window area is selected and stored as a subsignature (6 subsignatures per eye point). The selection process starts by generating error functions, i.e., functions of the sums of the absolute difference, resulting from comparisons of each candidate subsignature with the full signature. A minimum value $Q_{min}$ in the region outside a guard band can be found in each error function. Among these minima, the maximum $Q_{max}$ is found. The subsignature for which $Q_{max}$ was calculated is the most unique because it most poorly fits all portions of the signature other than its home position.

Figure 3:
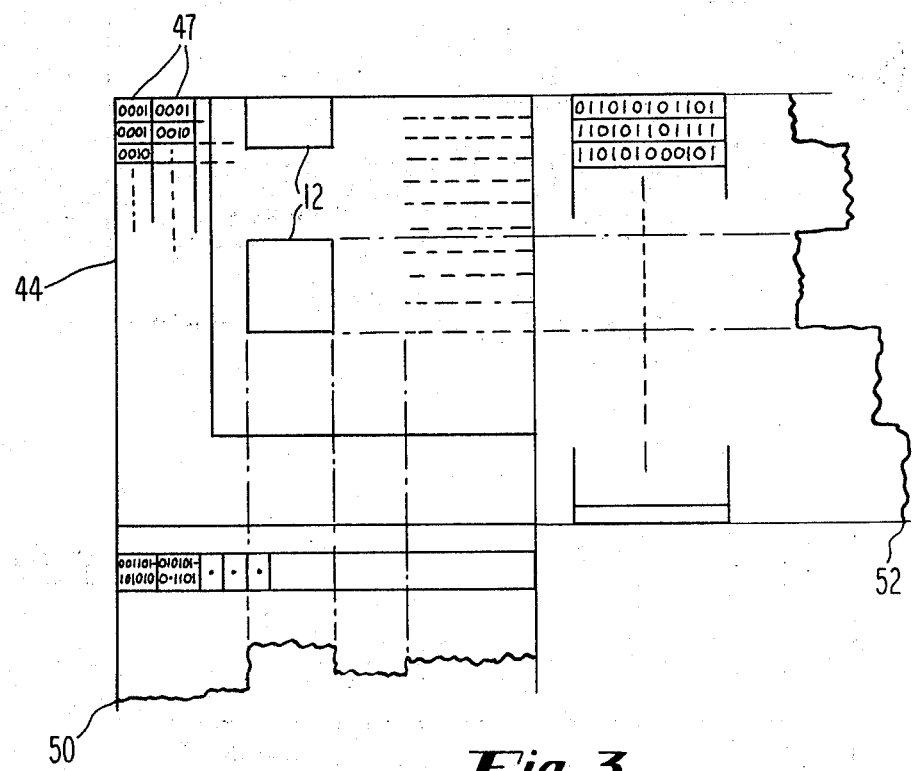
FIG. 3 shows how the digital representations of the die, picture elements, or "pixels", may be summed to yield unique signatures in X and in Y.

FIG. 3 shows how the fields of view 44 and 46 are divided in the picture tube and are digitized to provide a digital representation of the visible surface of the die 10. Each of the fields of view is divided within the camera into a large number of picture elements or "pixels" 47. In a preferred embodiment, the total field of view is 240×320 pixels wide, of which a 240 pixel square area is typically used. As is depicted schematically in FIG. 3, each of the pixels 47 may be thought of as containing a four-bit digital number, the "gray level" representative of the relative brightness of the light falling on the video sensor in the corresponding position. The contents of all of the pixels in each of the rows are summed, and likewise with the columns; that is, as shown in FIG. 3, all the elements along each of the horizontal lines are summed together with one another to form a series of sums, shown extending vertically to the right of FIG. 3, one for each row, while similarly, the gray levels of all of the pixels of each column are summed to form a series of sums, one per column, as shown at the bottom of FIG. 3. It is found by the present inventors that such a sum is, at most, 12 digital bits long for 240 4-bit samples. It will be appreciated by those skilled in the art that each 12-bit sum is therefore indicative of the total light intensity falling on a given row or column of pixels. The series of 240 sums of individual elements extending in the X and Y directions in FIG. 3 will be referred to respectively as X and Y "signatures" herein. These signatures are both thus a 240×12-bit array of digital data. If such a series of 240 digital sums or signatures is converted to points on a graph, the X signature for a portion of a chip, as shown, might look something like the line 50 at the bottom of FIG. 3 while the Y signature could look something like that at the right of FIG. 3 at line 51; these may be thought of as graphical representations of the digital signatures.

Those skilled in the art will recognize that while it is impossible to resynthesize the actual digital picture of the surface of the die from the signatures, the number of pixels contributing to the sums is sufficiently large that the signatures are substantially unique with respect to any given die thus viewed, sampled and summed. It is this principle which is used in the present invention, as follows: in both X and Y directions, that portion of the signature or subsignature which is most unlike all the other portions of the signature of like length is located, and this is stored during a "teach" mode of operation of the apparatus of the invention. That is, in the teach mode $160-64+1=97$, 64-element subsignatures are each iteratively compared with 81 64-element sub-portions of the total 240-element signature centered about their home position (except that from which they are taken, as discussed below). Thus, the correspondence between each proposed subsignature and the 40 64-element portions of the signature to either side of its home position is measured. The comparison step measures the difference between the subsignature and each selected portion of the signature by summing the absolute value of the difference between each element of the subsignature and the corresponding element of the signature portion. A large sum indicates large differences or a poor fit; a lower sum implies a better match. An indication of the quality of the best fit of each subsignature, i.e., the minimum mismatch with a portion of the main signature outside of the home region "guard band," is saved and referred to as $Q_{min}$. $Q_{min}$ is thus indicative of the degree to which the particular subsignature differs from the particular group of elements of the total signature of equal length which most nearly approximates the home position of the subsignature. $Q_{min}$ is therefore a measure of the degree to which that subsignature could be used as a tool to help locate the position of a target die. A $Q_{min}$ is thus determined for each possible subsignature; that $Q_{min}$ which is largest, $Q_{max}$, is then that which corresponds to the subsignature which is the most informative with respect to determining the location of a particular die. Stated differently, $Q_{max}$ is $Q_{min}$ for that subsignature which is the most unlike each portion of the total signature of like length outside the guard band to which it was compared. That subsignature is then used in the run mode of operation, for comparison with signatures generated with respect to each target die to be located.

Figure 4:
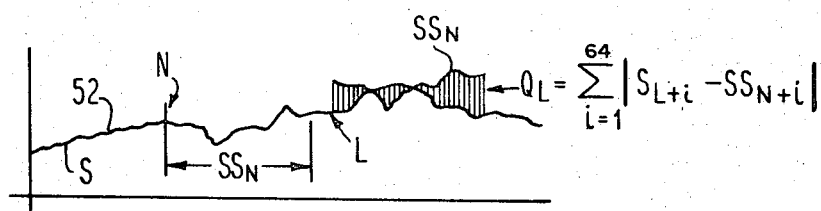
FIG. 4 shows how sub-portions of the signatures or "subsignatures" are compared with the total signatures to determine their correspondence.
Figure 5:
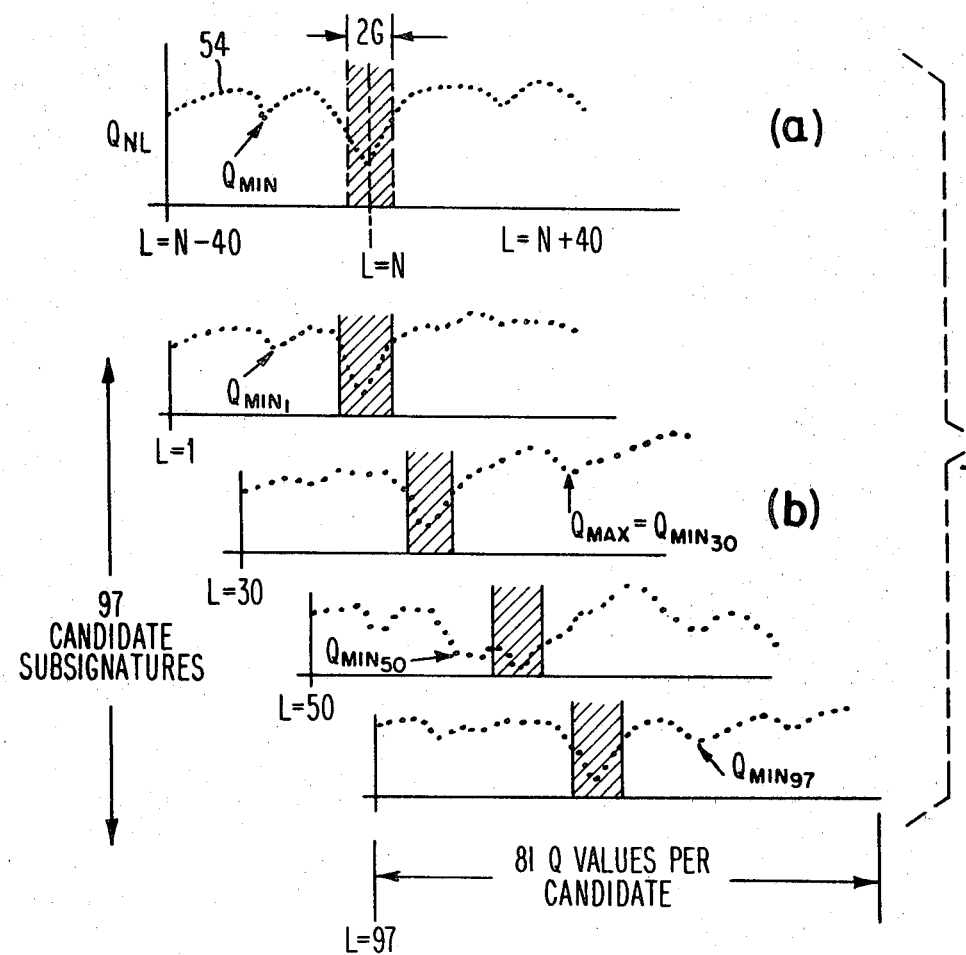
FIG. 5a shows typical results of graphing the correspondence, or "error function", of a particular subsignature.
FIG. 5b shows how the subsignature most informative in identification of a portion of the chip may be identified.

This process is shown schematically in FIG. 4 where a subsignature $SS_N$ is iteratively compared with the total signature 52. N is a pointer indicating the location on the main signature from which the subsignature $SS_N$ was drawn. For each subsignature $SS_N$, a $Q_L$ is developed indicative of the correspondence between the subsignature and the Lth portion of the total signature; where L=N, therefore, the correspondence is exact and $Q_L$ is minimized. At other points shown on the drawing, the correspondence is less exact, and accordingly the value of $Q_L$—equal to the shaded area between $SS_N$ and the 64-element portion of the signature beginning at the location L—will be substantially greater. This is shown in FIG. 5 wherein the $Q_L$'s are graphed as a function of their position, varying from N−40 through N+40; that is, for a particular subsignature $SS_N$, 81 $Q_L$ values are derived by comparison of the sub signature $SS_N$ with the 81 comparable portions of the main signature. When these $Q_L$'s are graphed versus L, the result will be a graph such as shown at 54 in FIG. 5(a), referred to as an error function (EF). The value of the $Q_L$'s generally varies somewhat. Where N=L, that is, where the subsignature $SS_N$ was compared with the Lth portion of the signature, from which it was selected, clearly the value of $Q_L$ will be a minimum, as indicated at the dotted line. Accordingly, this value is deleted from those compared to locate $Q_{min}$, that $Q_L$ indicative of the closest identity reached between the particular subsignature $SS_N$ and any portion of the total signature. Similarly, some small number G of signature positions, on either side of L=N are not considered in the determination of $Q_{min}$. (In the presently preferred embodiment to which the various numeric values given refer, G=8.) A "guard band" 2G positions wide is thus established. This is done because the home position (N=L) and its immediate neighborhood of a candidate subsignature $SS_N$ will naturally have lower mismatch values $Q_L$ than elsewhere. As the minimum $Q_L$ elsewhere is what is sought, the guard band is used to prevent identification of the Q at or near the home position from being identified as $Q_{min}$. Accordingly, identity of the subsignature $SS_N$ under test with portions of the signature in the region of the subsignature's origin are not used in the determination of $Q_{min}$.

The largest value of $Q_{min}$ determined in stepping through the n=1, (160−64+1) possible sub signatures is saved. The largest of the $Q_{min}$'s, $Q_{max}$, is $Q_{min}$ of that subsignature which least closely resembles each portion of the main signature (except itself), and is thus that subsignature which is most unique and likewise most informative and most useful in later identifying the precise location of a target die. A pointer indicative of the location of this subsignature within the total signature (i.e., of N) is thus stored in the teach mode. FIG. 5b shows this process schematically—that $Q_{min}$ which is largest is identified as $Q_{max}$.

Figure 6:
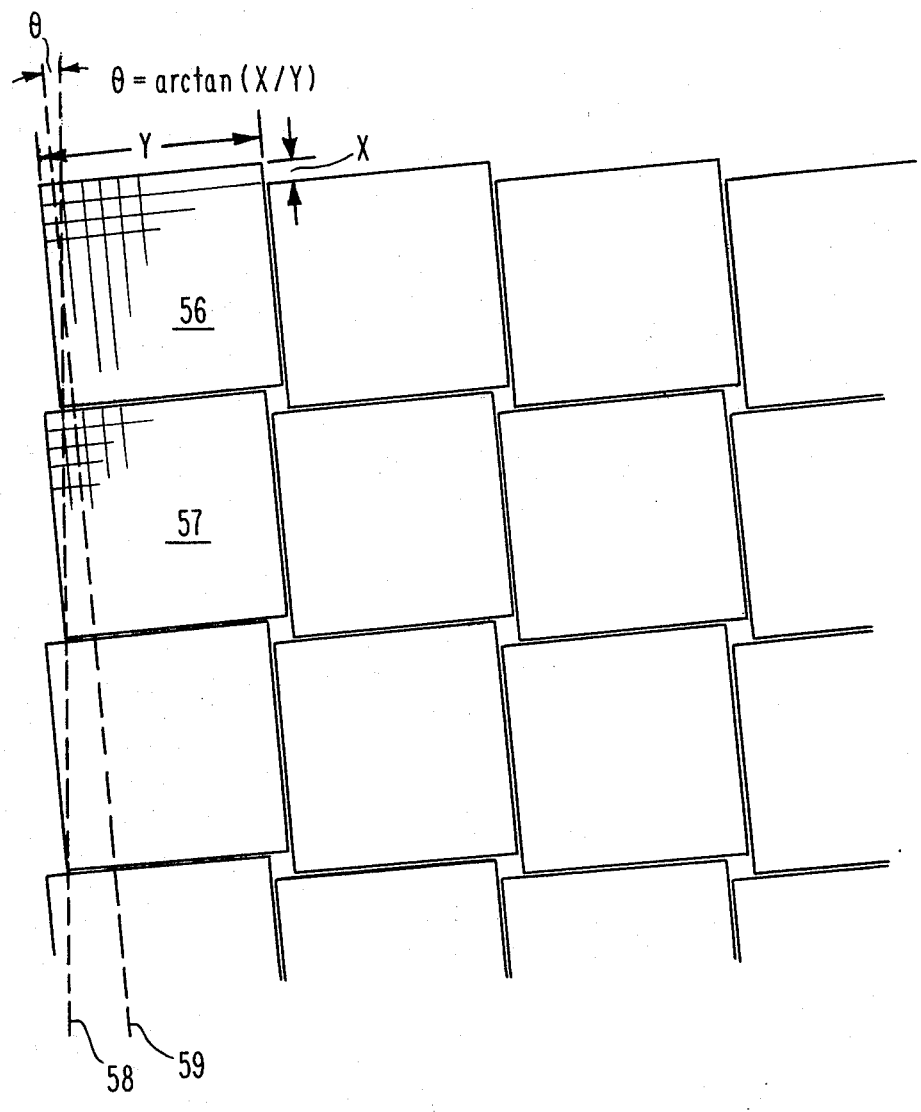
FIG. 6 shows the geometric distribution configuration for rotated signature generation.

The above process of finding the best sub signature for identifying a particular position on a die is repeated in the X and Y dimensions and is likewise repeated with respect to a "rotated" representation of the die. In a presently preferred embodiment, the die is effectively rotated through an angle of some 4.76° by the way in which the summation of the individual pixel values leading to the signatures is accomplished. The accomplishment of rotation through an angle of 4.76° may be accomplished very simply during the summing yielding the signatures by, e.g., adding the first 12 pixels in a given first column and moving over one column to the second column, adding the next 12 pixels, moving to the third column, adding the next 12 pixels, and so on. As the tangent of 4.76° is equal to 1/12, this provides an effective rotation of 4.76°. The process is shown schematically in FIG. 6, where 12×12 arrays of pixels 56, 57 are shown rotated through 4.76° and displaced 1 pixel per 12 pixel row or column. If a sum is taken of the 12 leftmost elements in a first array 56, then 12 in the second column of the second array 57, and so on, as indicated by the dotted line 59, a signature substantially the same as a signature obtained by actually scanning a rotated target through the angle formed by lines 58 and 59 is obtained. This may be done counter-clockwise or clockwise simply by choice of the direction of movement from column to column or from row to row depending on whether X or Y signatures are being calculated at a particular time. Furthermore, it will be appreciated that if rotation through 4.76° is accomplished and the optimal $Q_{max}$ for each of the three positions is determined, this implies that the center position has a tolerance on the order of ±4.76°/2. Accordingly, the net angular displacement of the die which can be tolerated according to this embodiment of the present invention is on the order of (3×4.76)/2 or some 7° in either the clockwise or anti-clockwise directions.

Overall then, in the teach mode, six calculations of the most unique subsignature, selected from the two total signatures are performed, 3 each, in the X and Y directions, normal, rotated clockwise and rotated anticlockwise; the highest $Q_{max}$ found in both X and Y is used to select the best portion of the signature for comparison with respect to a target die.

Figure 7:
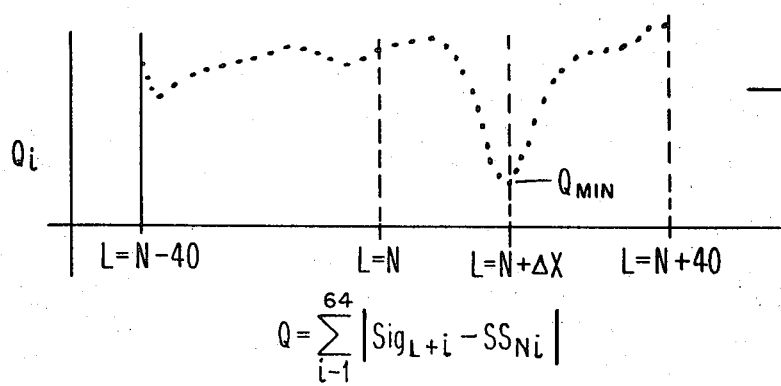
FIG. 7 shows an error function generated by comparing the selected reference subsignature with equal portions of the target signature, as used to determine the the location of the target.

The result of such a comparison is shown in FIG. 7, which graphically indicates results of comparison of a stored subsignature with a signature generated with respect to a target die. The subsignature is compared with each possible portion of the signature with the ±40 pixel range of operation of the present embodiment of the invention. Q values are generated at each of the 81 stages in accordance with the summation process discussed above; that is, Q is the sum of the absolute values of the difference between each one of the 64 stored values of the subsignature and the corresponding value of the subset of 64 of the total 240-element signature being examined. Q is thus indicative of the identity between the subsignature and that portion of the signature being examined. Were the series of Q's thus generated graphed as a function of N, as shown in FIG. 7, N being equal to the pointer of the location of the subsignature plus or minus a number ΔX of pixels, N+ΔX thus pointing to the portion of the signature being compared with the subsignature, the Q value will reach a minimum $Q_{min}$ indicating that correspondence has been found. ΔX is then the displacement in pixels of the die from the reference location N or "eyepoint", as defined by the subsignature $SS_N$. This information may be fed to the host processor for attaching wire bonding leads at positions displaced ΔX from their nominal position. The process is repeated for rotated subsignatures stored during the teach mode. If the value of Q, computed as above, is less for one of the rotated target samples than for the unrotated (normal) one, then this is an indication that the die is itself rotated, and a correction Δθ is additionally supplied to the host processor. The process is repeated in the Y dimension, thus completely specifying the actual location of the target die with respect to a nominal position.

It will be noted that the X and Y displacements are thus determined independently of one another, thus satisfying one of the objects of the invention mentioned above. If N comparison of subsignatures are made in both X and Y, the total number of comparisons is 2N. If a template matching or other scheme in which X and Y comparisons are not independent were instead made, $N^2$ comparisons would have to be made to yield equally detailed image resolution.

As noted above, the process may be repeated at diagonal corners of the die for additional insurance purposes. It will be appreciated by those skilled in the art that if a θ correction is necessary, this will be very thoroughly confirmed essentially by multiplication of the correction over the diagonal dimension of the die.

FIG. 8 shows a detail of the flowchart of the teach operation. It is initialized as at 100 by setting N, the number of the subsignature being considered to 40, defining the 160×160 array of pixels, and L, the location of the first point of the 81 64-element portions of the signature of which the Nth subsignature is being compared, equal to N−40, while $Q_{min}$ is set to an arbitrarily large number and $Q_{max}$ is set to zero. A first subsignature to be tried, beginning at a location N and running through location N+64, is brought from a RAM, in which the total signature is stored, into a subsignature RAM, at 102. The ith element of the Nth subsignature is referred to as $SS_{Ni}$. The sum of the 64 absolute values of the 64 differences between the Sig L+i, the (L+i)th signature element (i.e., the ith element of the signature portion beginning at L) and $SS_{Ni}$, the (N+i)th subsignature element, is then computed at 104; the total is referred to as $Q_{NL}$. This is then compared at 106 to see if it is less than a stored value of $Q_{min}$. If it is; that is, if $SS_N$ fits the Lth portion of the signature better than $SS_N$ fit any previous portion, $Q_{min}$ is then set equal to $Q_{NL}$, as at 108. If not, the next L is fetched (112), if it is not the last (110) and the process is repeated. If L is in the vicinity of N, as defined by a constant G, that is, if the subsignature is being compared to that area of the signature from which it was derived, this area is skipped over so that false indications of $Q_{min}$ are not generated, as at 114.

When the last L is reached, that is, when the Nth subsignature has been compared with all possible subsets (N−40≦L≦N+40) of the total signature, $Q_{min}$ is compared at 116 to see if it is greater than $Q_{max}$; that is to say, to see whether this Nth subsignature $SS_N$ is the most unique thus far tested. If so, $Q_{max}$ is updated to $Q_{min}$ at 118 and N, the pointer locating where the most unique subsignature is located, is stored in a latch 120. If this is not the last subsignature (122), the process is updated at 124 by setting N=(N+1) and L back to N+40 and repeating. If it is the last, the N latched may be taken to be the pointer of the most useful subsignature, while $Q_{max}$ is indicative of how useful it is, as indicated at 126; that is, of its relative uniqueness. The process may then be repeated with respect to rotated axes as outlined above, and with respect to the other coordinate (128). A test may be performed as at 130 with respect to a subsignature found with respect to a first eyepoint of the camera by physically moving the die with respect to the camera and performing a run operation as will be detailed below. After this is done, the die is physically moved with respect to the camera to a second reference or "eye point" and the entire process repeated as at 132 to generate a second set of subsignatures, that is, one each in X and Y for a second reference point.

Figure 12:
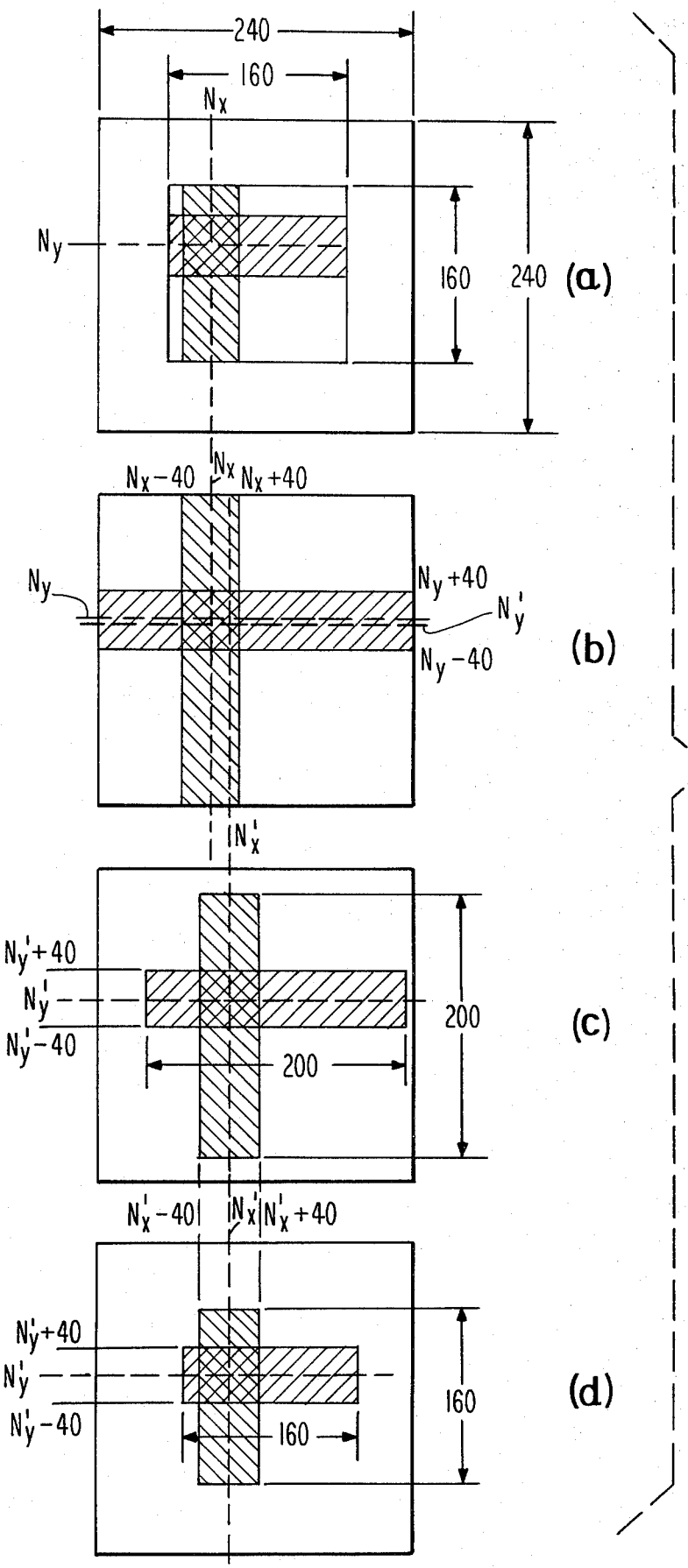
FIG. 12 comprises diagrams useful in explanation of details of the run operation.

FIG. 9 shows a detailed flowchart of the run operation. The maximum displacement of the die from its nominal position is a statistical function of manufacturing tolerances and the like; it is found in practice that an acceptably high number of dice fall within a ±40 pixel range from their nominal location. Accordingly, the subsignature generated as above in the teach mode need only be compared with areas of the signature disposed ±40 pixels from this reference area, which is useful in that the processing time involved in the run operation is minimized. Further, in this way any repetitive image having a frequency of less than 40 pixels does not cause erroneous identification. Accordingly, upon initialization $Q_{min}$ is set to a large number (140), and the subsignature $SS_N$ (having elements $SS_1$-$SS_{64}$) is supplied at 142, while at 144 P, a pointer indicating that portion of the signature to which the subsignature $SS_N$ is to be compared is set equal at initialization to N−40. A snapshot of the full signature is supplied, the individual elements of which are denoted by $Sig_{p+i}$, as at 146. The summation over i=0, 63 of the absolute value of the difference between $Sig_{p+i}$ and the corresponding subsignature element $SS_{Ni}$ is then calculated at 148, to yield the summation $Q_p$; that is, $Q_p$ is thus proportional to the degree of correspondence between the subsignature $SS_N$ and the Pth portion of the total signature. If this is the smallest $Q_p$ thus far detected, that is, if $Q_p$ is smaller than a stored value $Q_{min}$ (150), $Q_{min}$ is updated to equal $Q_p$ (152) and P is stored as $P_{min}$ (154), the pointer indicating the best fit thus far found. If P<(N+40), as at 156, P is incremented at 158 and the process is repeated. Eventually, $P_{min}$ will point to the location of the best match, as noted at 160, and accordingly ($P_{min}$−N) is indicative of ΔX, the displacement in pixels of the reference location from its nominal position. The process may be repeated and reperformed, with rotated signatures generated as above, with respect to the orthogonal coordinate, with restricted portions of the signatures, as detailed below in connection with FIG. 12, and reperformed at the second eye point, all as noted at 162-165.

It will be appreciated that the absolute value of $Q_{min}$ is inversely related to the degree of accuracy to which the sub signature selected corresponds to the signature of the target die. If this value is insufficiently low to indicate that a proper correspondence is found, as indicated at 166, a reject signal is passed to the host at 168, whereupon further processing may be performed. Another possibility is that the displacement ΔX for which an acceptable $Q_{min}$ is found is indicated to be +40 pixels, as at 169. If so, a better fit may be found at a ΔX slightly greater than +40. This fact can be indicated to the host and the total die physically moved some distance in the direction thus indicated as at 170. Alternatively, a different range of signatures −40<P<40 can be selected for comparison.

Reference will now be made to FIG. 10, which shows hardware for performing the operations according to the invention as discussed above. In FIG. 10, a microprocessor 60 is fed with video signals from an analog-to-digital converter 62 fed with signals from a camera 64. Signals from the camera 64 are also fed to a video processing unit 66 and thence to a television 68 useful in the operator's initially setting a reference point and also simply to monitor the operation of the process of the invention. The signatures are actually generated in random access memory/accumulator units 70 and 72 for X and Y signatures respectively, fed by the analog-to-digital converter 62 via a corridor select gate 63, the operation of which is detailed below, in connection with FIG. 12. A possible modification to the embodiment of the invention described would involve replacement of the camera and X and Y accumulators with a pair of cruciform linear scan arrays, either swept physically with respect to the die, to generate similar integrated, gray scale signature values, or provided with cylindrical optics for optical integration of gray scale values, for each axis. In a preferred embodiment all the signatures, both X and Y, and the rotated versions thereof are contained in single registers; that is, the digital signals output by analog-to-digital converter 62 are simply fed into the accumulators 70 and 72 as required; the sums are computed in real time simultaneously with conversion of the individual analog picture light intensity signals into gray level digital format, so that no storage of all the values of all the elements of the video picture need ever be performed. Selection of the signals between the two RAM/accumulator units 70 and 72 is performed by multiplex unit 74 controlled by the microprocessor 60. To the microprocessor 60 is also connected, via a host controller interface, a host processor 76, as discussed above, as is an additional RAM unit 78 for storage of a subsignature being processed. The summation of the absolute values of the differences between particular subsets of the signatures stored in one or the other of RAMs 70 and 72 and that stored in the sub signature RAM 78 is performed in a normalization and summing of the absolute difference unit 80 80, the details of which will be discussed below in connection with FIG. 11. The sum, typically indicative of Q, is compared with a previously determined $Q_{min}$ value latched in a latch 86 in comparator unit 84. For example, in the teach mode, each subsignature $SS_n$ is compared with 81 possible subsets of the total signature, and a Q value is generated for each of the possible positions. That is, for each of the 81 positions, a Q value is generated in the normalize the sum unit 80. Comparison is performed in comparator 84 between the $Q_{min}$ value previously determined to be the closest fit of that subsignature with a subset of the total signature, latched in latch 86. At the end of comparison of a particular proposed subsignature $SS_N$, the value of $Q_{min}$ is compared in a second comparator 90 with the highest value of $Q_{min}$ previously determined, this value $Q_{max}$ being stored in a second latch 88. The latch 88 may also store the location of the subsignature yielding $Q_{max}$.

Those skilled in the art will recognize that the summing operations are relatively simple data processing operations, but since a large volume of data is involved, a large amount of time would be required to perform the summing operation if this were not done efficiently. Accordingly, hardware means are provided, as noted above, for performance of the accumulation and summing functions, as well as for storage in hardware latch 86 of the $Q_{min}$ value generated with respect to each subsignature, while the $Q_{max}$ value representative of the best, i.e., most unique subsignature tested to date in a particular teach operation as determined by a software comparator 90 may be stored in software latch means 88.

Those skilled in the art will also recognize that the various summations used to yield the Q value, that is, the summations of the absolute values of the differences between each element of a particular subsignature under consideration and the corresponding elements of a subset of a total signature under consideration are only meaningful if the two are scaled to one another by a normalization process. That is, for example, variation in the light intensity between the time at which the sub signature is generated and the target signature is generated may cause variations in the absolute values of the digitized signals which are summed to produce the signature. Alternatively, reflectivity of the dice can vary, while other circuit conditions can change for a variety of reasons. Accordingly, normalization is performed. In a preferred embodiment, this is performed simply by taking the average value of the 64 elements of the signature being considered together with an average value indicative of the 64 elements of the subsignature under consideration and cross-multiplying the two, thus performing a normalization function. Other means of normalization would, of course, be possible. Manipulations of the averages and other operands used in the normalization, other than cross multiplication are useable.

FIG. 11 shows an enlarged view of the normalization and summing means 80. The signature array of interest is supplied as at 94 from either of RAMs 70 or 72. Similarly, the subsignature array is supplied from the subsignature RAM 78. The signature array is fed through a delay means 96 which might be a 64-byte shift register, while the average value of the 64 elements of the signature is calculated in an average generator 98. This may in a preferred embodiment simply comprise the sum of the 64 values, for reasons which will be clear below, so that the average generator 98 may simply be an accumulator. The value output by the generator 98 is multiplied in a multiplier 99 by each individual element of the sub signature. The multiplied sub signature value is then fed to an absolute value/differencing unit 97 which is also supplied via delay 97 with each individual element of the signature, having been multiplied in a second multiplier 93 by the average of the subsignature elements, (or their total, as noted above), supplied from a subsignature average register 95. Then, in summing unit 85, the sum of the differences between each weighted subsignature element and the corresponding weighted signature element output by unit 97 is computed. The total sum yielded, $Q_{NL}$, is inversely related to the correspondence between the 64-element subsignature beginning at a pointer location N, as compared with 64 elements of the signature beginning with a pointer location L. This may be compared, as noted above, with the previously latched value for $Q_{min}$. Eventually a $Q_{min}$ will be determined for the entire subsignature N, which may then be compared with the maximum $Q_{min}$ found with respect to all previously considered subsignatures; eventually the result, $Q_{max}$, will be found indicative of the best (i.e., most unique) subsignature which is then used to properly locate target dice with respect to reference points.

The process is repeated with respect to the orthogonal orientation, and to rotated signatures, each derived by use of camera 64 and analog-to-digital converter 62 to generate a "snapshot" of the sample die with respect to each orientation as discussed above, to generate the canted subsignatures. As noted above, the summation is performed with respect to the stepped columns at a rate determinative of the degree of canting desired. The six thus generated subsignatures are stored in a subsignature RAM 78. Those skilled in the art will recognize that substantially the same hardware may be, and in a preferred embodiment is, used in performance of the run mode. In turn, the stored subsignatures are fed to a normalizing and summing unit 80 as above for comparison with similarly-generated snapshots of the target die. Q values are generated by comparison of each subsignature with each possible subset of the total signature, and X and Y pointers indicative of the location of the subset of the X and Y signatures yielding the minimum Q, i.e., maximum correspondence, are then indicative of the degree of displacement $\Delta X$ and $\Delta Y$ of the target die with respect to the reference die; that is, for example, $N-L$, where L is the pointer indicating the beginning of the subset of the X signature yielding the minimum Q when compared with the subsignature beginning at location N, is equal to $\Delta X$, in pixels. If the process is repeated in X and in Y, with respect to rotated coordinates and with respect to a second eyepoint having a likewise generated sub signatures in X and Y and with respect to rotations thereof, a highly accurate, reliable and dependable method and apparatus for location of dice with respect to reference eyepoints will be provided.

It will be appreciated that the amount of the area of the taught region, or of the target region, which can be directly compared to a subsignature is limited by the width of the subsignature. Therefore, for a given area of interest, the outermost portions defined by half the width of the subsignature cannot be the center of the subsignature. This fact is exploited in the present invention to provide compensation for possible simultaneous variations in X and Y displacement of a die, or other target object, from its nominal position. Thus, for example, if a target is displaced in the X direction, i.e., along a horizontal row, and an integration is performed over each set of vertical columns, the result will be displaced from the nominal integrated position. Accordingly, in the run mode, the subset of possible subsignatures which are compared with a stored subsignature is gradually limited over plural "passes", that is, successive similar operations, to those areas previously identified as likely eyepoint-correspondent locations. The sub areas of the total field of view which are compared with the stored subsignature vary from pass to pass in accordance with the information about the position of the target found with respect to the orthogonal direction, so that the correspondence gets gradually more likely to be correct, while limiting the amount of comparison operations required to be performed. Thus, for example, in FIG. 12a, the overall area viewed by the camera is shown as 240 pixels square. Of these, the central area 160 pixels square is used in generation of the subsignatures and a subsignature centered about some pointer in X, $N_X$ and another about a pointer in Y, $N_Y$, will be found in the teach operation. Upon run in the X direction, the subsignature centered about $N_X$ will be compared with areas of the signature in the range $N_X-40$ and $N_X+40$, by the entire 240-pixel Y depth. While this will affect the accuracy of the comparison to some degree (as the subsignature is calculated over 160 of the 240 pixels considered in Run), it does eliminate variations in Y from affecting the X determination. The process is then performed similarly in the Y direction, centered about $N_Y \pm 40$ pixels as indicated. The area which is doubly shaded in FIG. 12b is thus the nominal position of the center of the subsignatures. Assuming that in the processing as outlined above, the actual position of the point corresponding to $N_X$ is found to be $N_{X'}$, as indicated by a dotted line, and that in Y is $N_{Y'}$, similarly indicated. Upon the second pass then, a smaller area or corridor some 200 pixels deep in both X and Y will be allowed to contribute to the portions of the signatures compared to the subsignatures, centered about $N_{X'}$ and $N_{Y'}$, respectively, thus yielding shaded areas for comparison as shown in FIG. 12c. In a presently preferred embodiment, the extent of the "corridors" thus defined is 200 pixels in the second pass. The same operation is then performed, if all is accurate, and $N_{X'}$ and $N_{Y'}$ do not vary, in a third run further centered about $N_{X'}$ and $N_{Y'} \pm 40$ pixels, by 160 pixels deep as indicated in FIG. 12d. The subsignature comparison then should be exactly comparable to that used in the teach mode. In this way the computation time required is reduced and the operation made more rapid, while ensuring that the ultimate subsignature location is found in an operation directly comparable to that performed during the teach mode. The same procedure is generally followed with respect to the rotated subsignatures; these are tried in the first and second passes. Similarly, upon practice of the process of the invention at the second eyepoint, the information as to angular displacement derived with respect to the first may be used to choose which second eyepoint subsignatures are compared.

Summarizing, those skilled in the art will recognize that there has been described a pattern recognition system useful in determining the precise location of a predetermined integrated circuit die to a host wire bonder, though the invention has utility in numerous other pattern-recognition applications. The pattern recognition system according to the invention requires picture information obtained from an optical system comprising a light source, optical means and a camera. The camera can use either a vidicon, solid state array, or like device to generate segmented analog representations of light intensity following thereon. These may be digitized to yield a numeric value for ready control. Profiles or signatures are used to uniquely characterize a particular scene and its position. Signatures are obtained by integration of the intensity values along columns of picture elements, or "pixels", and along each row of pixels. This produces an X signature and a Y signature. The displacement measurement is accomplished by iterative comparison of a particularly selected segment of the total signature, i.e., a subsignature, with a larger signature, looking for the best match. The search for the minimum mismatch gives accuracy to the nearest pixel. The minimum mismatch of Q, i.e., its actual amplitude, has a relative value in judging the confidence of the recognition, which may be referred to as the "scaled-Q". Its computation compensates for variation in the sub signatures obtainable from different dice. The scaled-Q value is compared with a predetermined threshold either to reject or accept a particular scene.

Displacement of a scene from a remote position can occur in X and Y and in $\theta$, i.e., upon rotation of the die. When considering X, one notes only vertical features since they are integrated without measurement of the distance between them. Hence, column integration can be performed without loss of data useful in horizontal measurement. Likewise, row integration can be done without interfering with the vertical measurement. The result of the integration provides a unique profile; a subset of this profile is chosen so that its length overlaps various scenes so as to enable accurate recognition. Integration of the digitized analog signals also reduces the effect of random electronic and camera noise which may be significant, particularly with respect to the use of vidicon-type cameras. In this connection, note that while noise and the like may affect the actual value of Q, the accuracy of the pointers generated is unaffected by such noise.

Normalization is performed in order to enable accurate comparison of subsignature to signatures to be made, by compensating for possible differences in illumination and between the taught and target scenes. This also compensates for signatures obtained from different depth columns or rows in the event that a restricted portion of the scene is desired to be viewed during a particular part of the processing operation. Normalization thus permits comparison of the substantial shape of the signature, rather than of its precise amplitude.

By stepwise summing portions of different rows at a specified ratio, an effectively rotated subsignature can be generated in both X and Y and this can be used to accommodate slight angular displacements of the die with respect to its reference position.

Perhaps most significantly, the novel integration over rows and columns of pixels in the signature generation step avoids template matching, thus reducing the number of comparisons required to locate a particular subimage with respect to a total image from $N^2$ to $2N$, as compared with typical template matching schemes.

Those skilled in the art will recognize that numerous refinements and improvements can be made to the system and method of the invention without departure from its essential spirit and scope, which is therefore not to be construed as limited by the above exemplary disclosure, but only by the following claims.

We claim:

1. A system for comparing groups of digitized data, comprising:
   a. means for processing a first group to obtain a first signature representative of a first information portion of said first group of data;
   b. means for selecting a set of subsignatures from said signature, said subsignatures representing selected respective portions of said first signature;
   c. means for selecting one of the set of said subsignatures which has the maximum relative information content, by successive comparison of the members of said set of subsignatures to said group;
   d. means for processing a second group to obtain a second signature representative of a corresponding first information portion of said second group; and
   e. means for comparing said selected subsignature to respective portions of said second signature in order to determine a comparison error for each said portion of said second group, and for designating the respective portion of said second group with respect to which the lowest comparison error is determined, as being the portion of said second group to which said selected subsignature corresponds.

2. The system as described in claim 1, wherein said means for selecting the one of said subsignatures which has the maximum relative information content comprises:
   means for comparing each of said subsignatures of said set with respective data portions of said first signature and determining the comparison yielding the minimum error of all of such comparisons performed with respect to each subsignature of said set; and
   means for selecting the subsignature of said set which has the maximum minimum error resulting from said comparing.

3. The system as described in claim 1, further comprising means for generating a system error signal as a function of the location of said designated respective portion relative to the location of said selected sub signature.

4. The system as described in claim 3, further comprising means for transforming said system error signal into a displacement signal representative of the displacement of the video view of a second group relative to said first group.

5. The system as described in claim 1, wherein said means for selecting one of said subsignatures comprises means for selecting the subsignature of said set which has the highest comparison confidence level compared to other subsignatures of said set.

6. The system as described in claim 5, comprising error function means for comparing each sub signature of said set with respective portions of said signature to obtain a set of error functions.

7. The system as described in claim 6, wherein said error function means comprises guard band means to inhibit generation of error functions with respect to portions of said signature within a predetermined range of each said sub signature.

8. The system as described in claim 1, wherein each of said groups represents a video view.

9. The system as described in claim 1, further comprising at least one host machine for performing predetermined operations, and means for controlling at least one of said predetermined operations as a function of said designation.

10. A system for comparing groups of digitized data, comprising:
   a. means for processing a first group to obtain a first signature representative of a first information portion of said first group of data;
   b. means for selecting a set of subsignatures from said signature, said subsignatures representing selected respective portions of said first signature;
   c. means for selecting one of said set of subsignatures;
   d. means for processing a second group to obtain a second signature representative of a corresponding first information portion of said second group; and
   e. means for comparing said selected subsignature to respective portions of said second signature in order to determine a comparison error for each said portion, and for designating the respective portion of said second group with respect to which the lowest comparison error is determined, as being the portion of said second group to which said selected subsignature corresponds;
   wherein each of said groups of data represents a two dimensional image, said system further comprising means for obtaining first signatures with respect to each of two orthogonal directions of said first image, and for obtaining second signatures in each of two orthogonal directions of said second image, and for obtaining subsignatures of said first signatures.

11. The system as described in claim 10, comprising integration means for obtaining each of said signatures, by summing over image data for a group in a first orthogonal direction to obtain a first signature perpendicular thereto, and summing image data for said groups in the second orthogonal direction to obtain a signature perpendicular to said first signature.

12. The system of claim 11, further comprising rotating means for generating signatures representing an image effectively rotated relative to the first image data group.

13. The system of claim 12, wherein said rotating means comprises means for controlling said integration means to regularly step across said image, perpendicular to said direction of summing, at a rate determined by the desired degree of rotation.

14. The system of claim 10, wherein said digitized data corresponds to an image of a target object, and said system further comprises means for reperforming said steps (a)-(e) with respect to second groups of data corresponding to second image portions of said target object.

15. The system as described in claim 10, further comprising cross normalization means for normalizing said subsignatures as a function of said signature and for normalizing said signature as a function of respective said subsignatures.

16. A system for comparing a target set of digital data with a reference set of digital data, said sets representing patterns extending in two or more orthogonal directions, comprising:
   means for processing the data of said reference set to obtain a reference signature comprising information representative of said reference set in a first of said orthogonal directions;
   means for selecting a number of proposed subsignatures from said reference signature, each of said subsignatures containing less than all of the information of said reference signature;
   means for selecting the subsignature of said set which has the highest relative information content;
   means for proecessing said target set to obtain a target signature containing information representative of said target in said first direction;
   means for comparing said subsignature having the highest relative information content with respective different subportions of said target signature and determining the subportion which provides the lowest comparison error; and
   means for generating a signal representative of a spatial displacement in said first direction of said target set with respect to said reference set as a function of said determined subportion.

17. The system of claim 16 wherein said means for selecting the subsignature having the highest relative information content comprises means for comparing each of said numbers of proposed subsignatures with respective subportions of said reference signature and means for selecting that proposed subsignature which corresponds least closely to any one of said subportions of said reference signature.

18. The system of claim 17 wherein said means for comparison comprises means for summing the absolute values of the differences between respective elements of a proposed subsignature and elements of a subportion of said reference signature.

19. A system for comparing a target set of digital data with a reference set of digital data, said sets representing patterns extending in two or more orthogonal directions, comprising:
   means for processing the data of said reference set to obtain a reference signature comprising information representative of said reference set in a first of said orthogonal directions;
   means for selecting a number of proposed subsignatures from said reference signature, each of said subsignatures containing less than all of the information of said reference signature;
   means for processing said target set to obtain a target signature containing information representative of said target in said first direction;
   means for comparing said selected subsignatures with all other portions of said reference signature and selecting that subsignature which corresponds least closely with each other portion of said reference signature; and means for generating a signal representative of a spatial displacement in said first direction of said target set with respect to said reference set as a function of said selected subsignature, wherein said patterns are video representations of physical objects and said data are gray scale values of video information in respective picture elements, and wherein said signatures are sums of the gray scale information contained in said picture elements, said sums being taken in both of said orthogonal directions to generate orthogonal signatures representative of the video image of a physical object.

20. The system of claim 19 wherein said second means for comparing comprises means for summing the absolute values of the differences between respective elements of each selected subsignature and of the corresponding element of the reference signature to which it is compared.

21. The system of claim 19 wherein means are additionally provided for generating an effectively rotated subsignature set from a reference signature corresponding to an effectively rotated portion of said signature.

22. The system of claim 21 wherein said sets of digital data representing patterns having two orthogonal directions comprise elements of data arrayed in each of said orthogonal directions, and are summed in each of said two orthogonal directions to generate said signatures, wherein said means for generating an effectively rotated subsignature set comprises means for iteratively summing over successions of a predetermined number of sequential ones of said data elements in said first orthogonal direction, said successions of predetermined numbers of data elements each being offset from one another by one element in the other of said orthogonal directions, whereby the degree of rotation effected is equal to the arc tangent of the inverse of said predetermined number.

23. A method for comparing like video images susceptible of relative rotation, comprising the steps of:
 a. generating digital data representative of a first image;
 b. generating first signatures representative of two orthogonal views of said first image;
 c. generating rotated first signatures representative of two relatively rotated orthogonal views of said image;
 d. selecting subsignature portions of each of said first signature and rotated first signatures, each of said subsignatures being selected by comparison of proposed subsignatures to plural portions of the corresponding signature, that one of said proposed subsignatures which corresponds least closely to any other portion of the corresponding signature being selected;
 e. generating digital information representative of a second image;
 f. generating second signatures representative of first and second orthogonal views of said second image and corresponding to said first signatures; and
 g. comparing each of said selected subsignatures corresponding to said first signatures and said rotated first signatures respectively with each of said second signatures, and determining from said comparisons the rotation of said second view relative to said first view.

24. The method of claim 23 wherein said video images are divided into orthogonal rows and columns of individual pixels, each pixel having assigned thereto a digital value representative of the gray scale of said video image, said signatures comprising elements, said elements each being generated by summing over rows or columns of said pixels, wherein said first signatures are generated by summing along the orthogonal axes of said pixels and said rotated signatures are generated by summing at an angle to said axes.

25. The method of claim 24 wherein said comparing of said first signatures and rotated first signatures with each of said second signatures is performed by iteratively comparing said subsignatures with respective portions of said second signatures to determine which of said first signatures and rotated first signatures corresponds most closely with said second signatures, whereby the degree of rotation of said second view relative to said first view is determined.

26. The method of claim 25 wherein said comparison of said subsignatures with said second signatures is performed by summing the absolute value of the differences between respective elements of said subsignatures and of said second signatures.

27. Method for locating a predetermined point with respect to an image comprising an array of image elements, said array being N rows deep by M columns wide, comprising the steps of:
 summing over each element of each row, to generate a first signature of N sums;
 summing over each element of each column to generate a second signature of M sums,
 iteratively comparing plural subsignatures, each comprising portions of said signatures, to other portions of said signatures to find that subsignature most different from all other portions of said signature, and
 thereafter using the subsignature thus found as a reference for comparison with like portions of comparable images.

28. The method of claim 27 wherein said iterative comparison is performed by summing the absolute values of the differences between corresponding elements of said subsignatures and of the signature portion compared, and taking as most different that subsignature for which the minimum sum derived by comparison to a particular portion of a signature is greatest.

29. The method of claim 28 wherein normalization is performed on said compared portions of signatures and subsignatures prior to said summing step.

30. The method of claim 29 wherein said normalization is performed by cross-multiplying the average value of said elements of said subsignature by the elements of the portions of the signature compared, and the average value of elements of the portion of the signature compared by the elements of the subsignature, prior to said summing step.

31. In a method of comparing a predetermined subportion of a first image to a larger portion of a like second image, to establish the spatial position of said second image with respect to a reference position located on said first image, the improvement which comprises:
 in a first teach mode, analyzing the total first image to determine that subportion most useful in said comparison, and storing said subportion; and in a second run mode, using said stored subportion for establishing the spatial position of said second image;

wherein said analyzing step comprises processing said image to yield information-containing signatures representative of said image and iteratively comparing selected subportions of said first signature to corresponding other portions of said first signature, and selecting for storage that subportion which least closely corresponds to all portions of said first signature other than itself.

32. The method of claim 31 wherein said signatures comprise summed image density values taken along a line in said image, and said comparison with respect to a given sub-portion and a given other portion reflects the sum of the absolute values of the differences between corresponding elements of said given sub-portion and said given section of said signatures.

33. In a method of comparing plural stored reference sub-images of an object with a target object, to determine displacement and angular rotation of said target with respect to said stored images, the improvement which comprises:

comparing a first stored reference sub-image with a first portion of an image of said target to determine displacement and angular rotation and using the result determined to yield a starting point for comparison of a second stored reference sub-image with a second portion of an image of said target, wherein said stored reference sub-images are selected to maximize their information content by iteratively comparing coded representations of portions of the reference image with similarly coded other portions of the reference image, and selecting for storage that coded representation of a portion of the image which corresponds least closely to all the other coded portions.

34. Method for generating a subsignature useful in relating a target image to an object image, comprising the steps of:

dividing the object image into a plurality of pixels organized as rows and columns;

summing the video value of the image in each cell along each row and along each column, to obtain vertical and horizontal signatures each comprising a series of summed video values equal in length to the number of rows and of columns respectively;

selecting a plurality of subsignatures of each of said horizontal and vertical signatures, said subsignatures comprising lesser numbers of said summed video values than said signatures;

comparing each of said selected subsignatures with other portions of the corresponding signature of like length and determining for each of said subsignatures, the degree of greatest similarity of each said subsignature to another portion of the corresponding signature; and selecting the subsignatures having the least similarity to any other portion of the corresponding signature as those to be used in relating said object image to a target image.

35. The method of claim 34 wherein said step of comparing a subsignature to a portion of a signature of like length comprises the step of summing the absolute values of the differences of the video values in the corresponding pixels of the subsignature and the portion of the signature, whereby a relatively large sum indicates a relatively low degree of similarity.

36. An apparatus for generating a subsignature useful in relating a target image to an object image, comprising:

means for dividing the object image into a plurality of pixels organized as rows and columns;

means for summing the video value of the image in each cell along each row and along each column, to obtain vertical and horizontal signatures each comprising a series of summed video values equal in length to the number of rows and of columns respectively;

means for selecting a plurality of subsignatures of each of said horizontal and vertical signatures, said subsignatures comprising lesser numbers of said summed video values than said signatures;

means for comparing each of said selected subsignatures with other portions of the corresponding signature of like length and determining for each of said subsignatures, the degree of greatest similarity of each said subsignature to any other portion of the corresponding signature; and means for selecting the subsignatures having the least similarity to any other portion of the corresponding signature as those to be used in relating said object image to a target image.

37. The apparatus of claim 36 wherein said means for comparing a subsignature to a portion of a signature of like length comprises means for summing the absolute values of the differences of the video values in the corresponding pixels of the subsignature and the portion of the signature, whereby a relatively large sum indicates a relatively low degree of similarity.

* * * * *